(No Model.) 2 Sheets—Sheet 2.
C. B. RICHARDS.
CUT-OFF GOVERNOR FOR STEAM ENGINES.
No. 290,113. Patented Dec. 11, 1883.
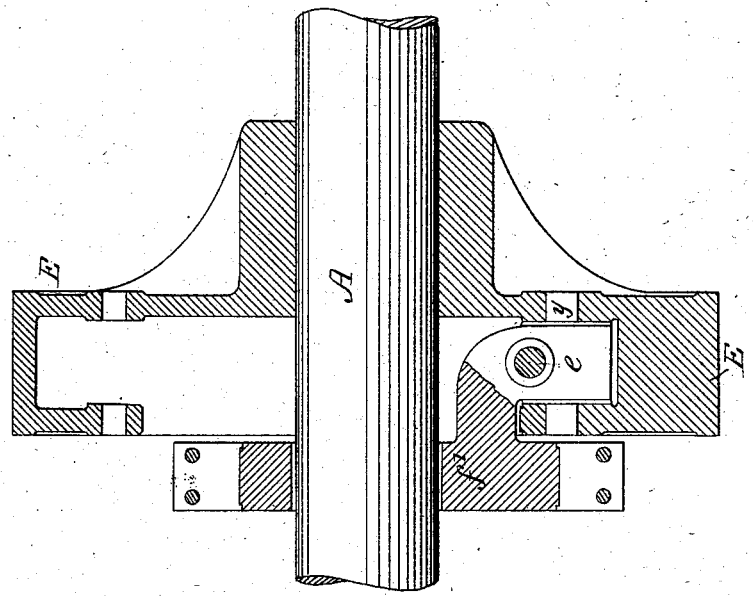
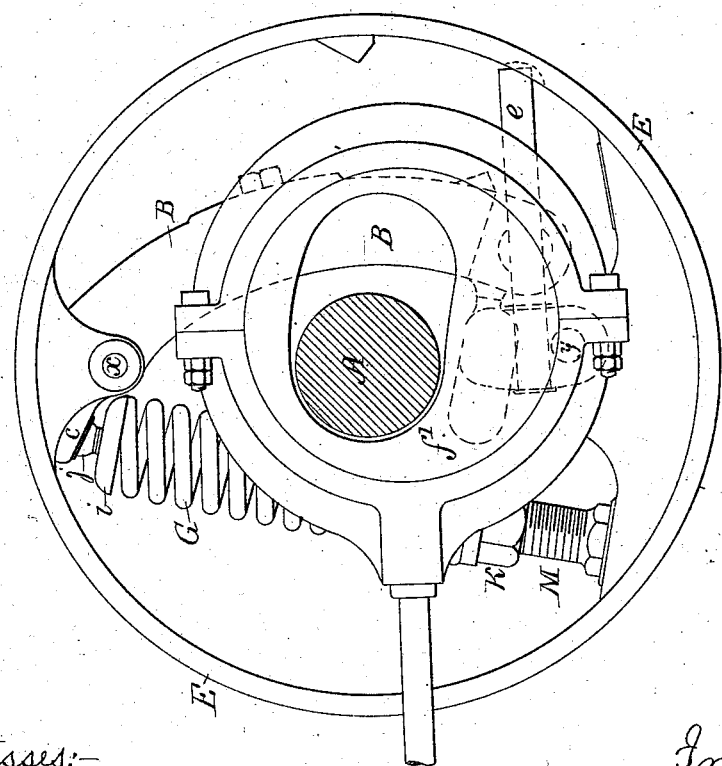
Witnesses:—
John E. Barker
James F. Tobin
Inventor:
Charles B. Richards
by his Attorneys
Howson and Son

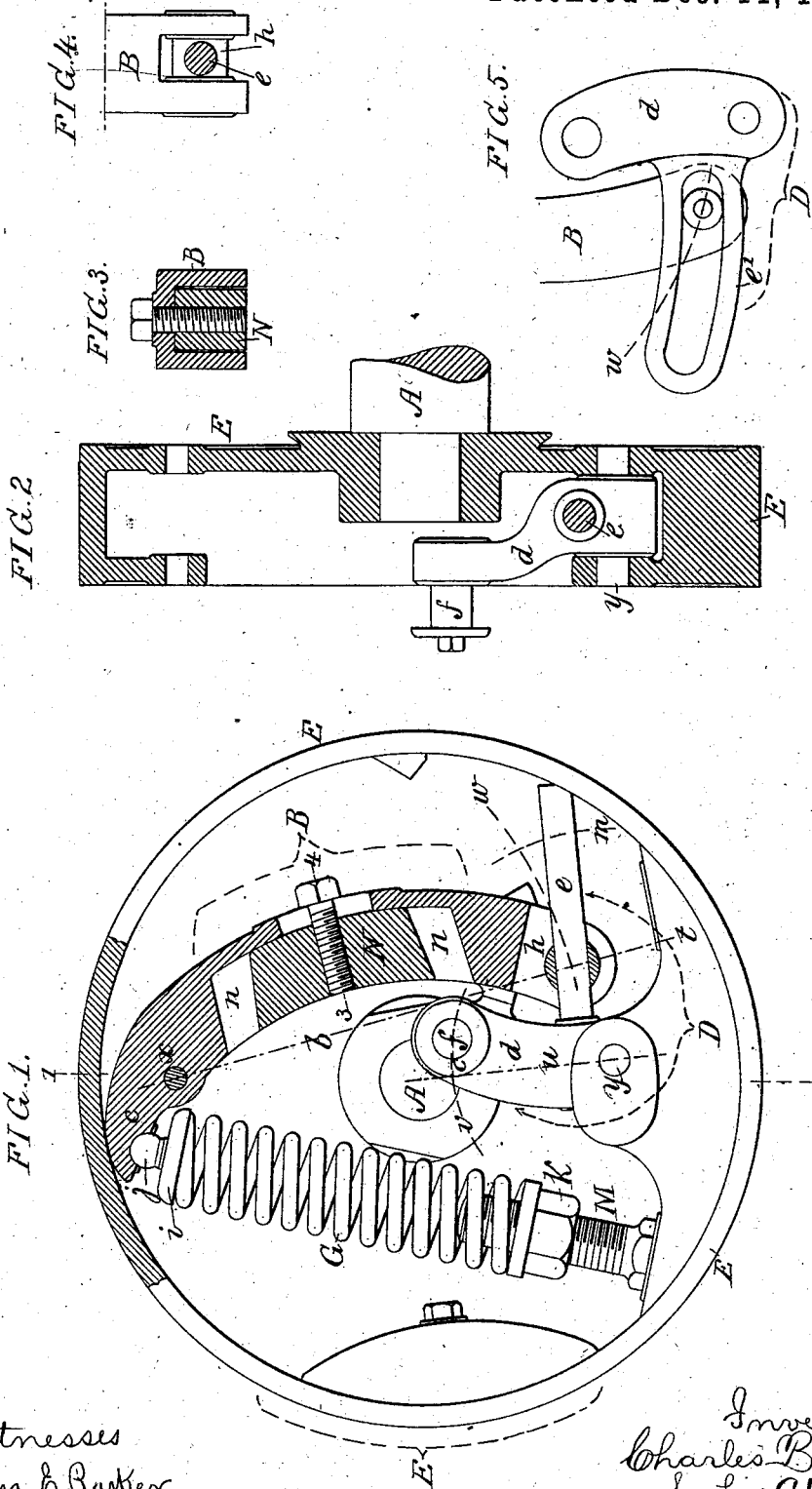

UNITED STATES PATENT OFFICE.

CHARLES B. RICHARDS, OF PHILADELPHIA, PENNSYLVANIA.

CUT-OFF GOVERNOR FOR STEAM-ENGINES.

SPECIFICATION forming part of Letters Patent No. 290,113, dated December 11, 1883.

Application filed August 24, 1883. (No model.)

*To all whom it may concern:*

Be it known that I, CHARLES B. RICHARDS, a citizen of the United States, residing at Philadelphia, Pennsylvania, have invented certain Improvements in Cut-Off Governors for Steam-Engines, of which the following is a specification.

My invention relates to certain improvements in that class of cut-off governors in which an arm or lever and a spring, both carried round with the crank-shaft, operate to maintain the engine at its normal speed; and the main object of my improvements, which are fully described hereinafter, is to insure the steady and sensitive action of the governor by preventing the jars and shocks due to the operation of the valve from interfering with the effective action of the arm or lever, on which depend the alterations in the throw of the pin connected to the valve.

In the accompanying drawings, Figure 1, Sheet 1, is a side view, partly in section, of my improved governor cut-off; Fig. 2, a section on the line 1 2; Fig. 3, a section on the line 3 4, Fig. 1; Fig. 4, an edge view of the forked end of the weighted arm; Fig. 5, a modification of part of Fig. 1; and Figs. 6 and 7, Sheet 2, views illustrating a modification of my invention.

Referring to Figs. 1, 2, 3, 4, and 5, Sheet 1, A is the crank-shaft of a steam-engine, and to any available attachment on this shaft are pivoted the weighted arm B and lever D. A fly-wheel or pulley may be utilized to form the desired attachment to the crank-shaft; but in most cases, and by preference, the pivot-pins $x$ and $y$ of the arm and lever will be on a flanged disk, E, secured to the crank-shaft, as shown in the drawings. The arm $d$ of the lever D carries the pin $f$, which is connected to the valve (it may be an ordinary slide-valve) of the steam-engine. The cylindrical arm $e$ of the said lever D passes through a pin, $h$, which is arranged to swivel on the forked end of the arm B, the latter being acted on by any suitable spring which will tend to maintain the arm in the position shown in Fig. 1, which is the limit of its inward movement, and where a projection on the arm is in contact with a projection on the arm $d$ of the lever D. I prefer the spring which is shown in the drawings, and the advantages of which will be explained hereinafter.

On noting the position of the center of the crank-shaft in respect to the pin $f$, it will be seen that the latter is simply a crank-pin for determining the throw of the valve. When the arm B is moved outward by centrifugal force, the center of the swivel-pin will pursue the course indicated by the dotted arc $w$ of a circle; hence, as the swivel-pin slides outward on the cylindrical arm $e$ of the lever D, the center of the valve-pin $f$ will move in the dotted arc $v$ of a circle, the valve-pin $f$ will approach nearer to the center of the crank-shaft, and the throw of the valve will be diminished, the center of the valve-pin $f$ being at about the point where the dotted line $u$ crosses the dotted arc $c$ when the arm B is at the limit of its outward movement—that is, when it has been arrested by a projection on the disk E. The spring which acts on the arm B and the weight of the latter are so regulated that the lever will remain in the position shown in Fig. 1 until the crank-shaft is revolving nearly at its normal speed. When any undue increase of speed of the engine takes place, there will be an outward movement of the arm B, due to centrifugal force, and consequently a decrease in the throw of the valve, and hence the tendency of the device is to maintain the engine at its normal speed.

Referring again to Fig. 1, and noting the relation of a dotted line, $b$, drawn through the center of the pivot-pin $x$ and center of the swivel-pin, to the direction indicated by the dotted arc $m$ of a circle in which the arm $e$ of the lever D must move, it will be seen that this lever is always substantially locked by and under the control of the arm B, no matter what may be the position of the latter; hence, while this arm is always free to act under the combined influence of centrifugal force and the spring, and to control the lever D, no jars imparted to the latter can have any material control over the arm to swing it one way or the other.

It is not essential that the lever D should have a cylindrical arm, $e$, passing through a swivel-pin on the arm B. A slotted arm, $e'$, for instance, may be substituted for the cylindrical arm, and a pin at the end of the arm B may extend into the slot, which, if deemed necessary, may be made in the arc of a circle or other curve, as shown in Fig. 5. I prefer to use the spiral spring G, which is furnished at one end with a cap, $i$, having a spherical termination, $j$, adapted to a corresponding socket in the extension $c$ of the arm B, the opposite end of the spring bearing against a nut, K, on a set-screw, M, which extends a short distance into the coils of the spring, and which is secured to the disk E. By turning the nut M more or less rigidity may be imparted to the spring G as the requirements of the governor may suggest.

By the arrangement of the lever B on one side of the crank-shaft, I am enabled to combine with it a long spiral spring on the opposite side, this long spiral being of special advantage, as it is more uniform in its action than a flat spring or short spiral.

It is advisable that provision should be made for regulating the effective weight of the arm B, for which reason I form a recess, $n$, in the same for the reception of a block, N, which is shorter than the recess, and which is secured by a set-screw passing through a slot in the lever, so that after loosening this screw the block N may be adjusted within the recess $n$.

In Fig. 2 the crank-shaft A of the engine terminates at the disk E; but there are instances in which it is desirable for the crank-shaft to extend through and beyond the disk, as shown in Fig. 7, in which case I modify the lever D, as shown on Sheet 2, by substituting for part of the arm $d$ and valve-pin $f$ a disk, $f'$, having an opening large enough to admit the crank-shaft and to permit the necessary movement of the lever, the disk being embraced by a strap similar to that of an ordinary eccentric, and this strap being connected to the valve-spindle. The disk, in fact, is a simple enlargement of and equivalent to the valve-pin $f'$.

I claim as my invention—

1. A cut-off governor in which the following elements are combined, namely: first, an attachment to the crank-shaft of a steam-engine; second, a lever, D, pivoted to the said attachment and carrying the valve-pin; third, an arm, B, also pivoted to the attachment and having a pin or projection adapted to slide in or on an arm of the lever which carries the valve-pin; and, fourth, a spring for acting on the said arm B, all substantially as set forth.

2. The combination of the crank-shaft and an attachment thereto, and the weighted arm pivoted to the said attachment and acted on by a spring, with the arm D, also pivoted to the attachment and controlled by the said arm B, and with the enlarged pin or disk $f$, carried by the said arm D, and having an elongated opening for admitting the crank-shaft, all substantially as set forth.

In testimony whereof I have signed my name to this specification in the presence of two subscribing witnesses.

CHARLES B. RICHARDS.

Witnesses:
 H. R. SHULTZ,
 HENRY HOWSON, Jr.